United States Patent
Huang et al.

(10) Patent No.: US 8,714,545 B2
(45) Date of Patent: May 6, 2014

(54) PAPER INVERTING DEVICE

(75) Inventors: Wen-An Huang, Taipei (TW);
Chao-Min Yang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 13/600,794

(22) Filed: Aug. 31, 2012

(65) Prior Publication Data
US 2014/0015190 A1    Jan. 16, 2014

(30) Foreign Application Priority Data

Jul. 13, 2012 (TW) .............................. 101125394 A

(51) Int. Cl.
*B65H 29/00* (2006.01)
*B65H 5/00* (2006.01)
*B65H 15/00* (2006.01)
*B65H 29/58* (2006.01)

(52) U.S. Cl.
CPC .......... *B65H 15/00* (2013.01); *B65H 2301/333* (2013.01); *B65H 29/58* (2013.01)
USPC ............................. 271/186; 271/225; 271/185

(58) Field of Classification Search
USPC ......... 271/186, 189, 185, 184, 207, 3.14, 225
See application file for complete search history.

(56) References Cited

U.S. PATENT DOCUMENTS

| | | | | |
|---|---|---|---|---|
| 2,363,490 A | * | 11/1944 | Avery | 101/132 |
| 4,300,757 A | * | 11/1981 | Koiso et al. | 271/207 |
| 4,575,069 A | * | 3/1986 | Burkhart | 271/186 |
| 4,712,785 A | * | 12/1987 | Stemmle | 271/187 |
| 5,031,893 A | * | 7/1991 | Yoneda et al. | 271/65 |
| 5,157,450 A | * | 10/1992 | Kim | 399/405 |
| 6,648,320 B2 | * | 11/2003 | Iino et al. | 271/3.15 |
| 7,481,427 B2 | * | 1/2009 | Tokutsu | 271/186 |
| 7,984,908 B2 | * | 7/2011 | Chan et al. | 271/291 |
| 8,177,225 B2 | * | 5/2012 | Tokutsu | 271/186 |

* cited by examiner

*Primary Examiner* — Patrick Cicchino
(74) *Attorney, Agent, or Firm* — Kirton McConkie; Evan R. Witt

(57) ABSTRACT

A paper inverting device includes a first sensor, a second sensor, a guiding structure, a power mechanism, and a controller. The power mechanism is used for driving rotation of the guiding structure. The first sensor is used for detecting the position of the paper. The second sensor is used for detecting the thickness of the paper. According to the sensing signals from the first sensor and the second sensor, the controller may determine the timing of rotating the guiding structure and the rotating direction and the rotating angle of the guiding structure. Consequently, the guiding structure may be controlled to stop the paper and further invert the paper.

14 Claims, 14 Drawing Sheets

PAPER INVERTING DEVICE

FIELD OF THE INVENTION

The present invention relates to a paper inverting device, and more particularly to a paper inverting device that is rotatable in two directions.

BACKGROUND OF THE INVENTION

For facilitating the user to print or scan a large number of papers, an office machine (e.g. a copier, a printer or a scanner) is usually equipped with an automatic document feeder. By means of the automatic document feeder, a stack of papers can be successively fed into the office machine one by one. Consequently, the papers can be printed or scanned in a labor-saving manner.

Although the use of the automatic document feeder can reduce the manual feeding requirement of the conventional office machine, there are still some drawbacks. Hereinafter, the associated drawbacks will be illustrated by referring to an automatic document feeder with a duplex feeding function.

In this context, the automatic document feeder with a duplex feeding function is also referred as a duplex automatic document feeder. FIGS. 1~3 schematically illustrate the actions of a conventional duplex automatic document feeder. As shown in FIGS. 1~3, the conventional duplex automatic document feeder 10 comprises a paper tray 11, a first paper transfer path 12, and a second paper transfer path 13. Moreover, a scanning apparatus 20 is disposed under the duplex automatic document feeder 10. The scanning apparatus 20 comprises a scanning window 21.

As shown in FIG. 1, a first paper S1 is fed into the conventional duplex automatic document feeder 10. Then, the first paper S1 is moved to the position near the scanning apparatus 20 along the first paper transfer path 12 of the conventional duplex automatic document feeder 10. Then, a first side P1 of the first paper S1 is contacted with the scanning window 21 of the scanning apparatus 20, so that the image of the first side P1 of the first paper S1 is scanned. Then, the scanned first paper S1 is continuously moved toward the paper tray 11.

Then, the process of transferring and scanning a second side P2 of the first paper S1 will be illustrated with reference to FIG. 2. After the first paper S1 is introduced into the paper tray 11, the first paper S1 is transmitted to the second paper transfer path 13 of the conventional duplex automatic document feeder 10. Then, the first paper S1 is moved to the position near the scanning apparatus 20 again. Then, the second side P2 of the first paper S1 is contacted with the scanning window 21 of the scanning apparatus 20, so that the image of the second side P2 of the first paper S1 is scanned. Then, the scanned first paper S1 is moved toward the paper tray 11, wherein the second side P2 of the first paper S1 faces downwardly toward the paper tray 11.

After the papers have been completely scanned, it is preferred to allow the sequence of the page numbers of the scanned papers on the paper tray 11 to be identical to the sequence of the page numbers of the original stack of papers. For achieving the purpose, as shown in FIG. 3, the first paper S1 should be transmitted to the second paper transfer path 13 again by the conventional duplex automatic document feeder 10. The first paper S1 is then transmitted to the paper tray 11 through the second paper transfer path 13. In such way, the second side P2 of the first paper S1 faces upwardly in the direction opposite to the paper tray 11. After the first paper S1 is outputted to the paper tray 11, a second paper S2 is started to be fed into the first paper transfer path 12 by the conventional duplex automatic document feeder 10.

From the above discussions, for allowing the sequence of the page numbers of the scanned papers to be identical to the original stack of papers, each paper should be transferred by the conventional duplex automatic document feeder for three times during the duplex feeding operation is performed. Consequently, if the conventional duplex automatic document feeder is employed to process a large number of papers, the cost associated to the processing time is increased and the feeding efficiency of the conventional duplex automatic document feeder is largely impaired.

SUMMARY OF THE INVENTION

The present invention provides a paper inverting device with high efficiency.

In accordance with an aspect of the present invention, there is provided a paper inverting device for an automatic document feeder. The automatic document feeder includes a paper exit and a paper tray. The paper inverting device includes a first sensor, a guiding structure, a power mechanism, and a controller. The first sensor is located upstream of the paper exit for detecting a position of a paper. The guiding structure is disposed over the paper tray and arranged beside the paper exit, wherein the guiding structure comprises a bent part for stopping the paper. The power mechanism is connected with the guiding structure for driving rotation of the guiding structure. The controller is used for controlling a rotating direction and a rotating angle of the guiding structure. When the paper is detected by the first sensor, the power mechanism drives rotation of the guiding structure in a first direction, so that a front end of the paper is contacted with the bent part of the guiding structure. When the paper is transmitted to the paper tray in a reverse feeding direction, the power mechanism drives rotation of the guiding structure in a second direction, so that the guiding structure is gradually distant from the paper.

In an embodiment, the power mechanism includes a DC motor and a gear.

In an embodiment, the guiding structure further includes a post. In addition, the post is fixed on a wheel surface of the gear.

In an embodiment, the first sensor is an optical sensor.

In an embodiment, the paper inverting device further includes a second sensor for detecting a thickness of the paper. As the thickness of the paper is increased, the rotating angle of the guiding structure is increased.

In an embodiment, the second sensor is a torque sensor.

In an embodiment, the bent part is a curved plate.

In an embodiment, the bent part includes two flat plates. The two flat plates are connected with each other. In addition, an included angle is formed between the two flat plates.

In an embodiment, when the front end of the paper is contacted with the guiding structure and the guiding structure is in a static status, the paper is pressed by the guiding structure.

In accordance with another aspect of the present invention, there is provided an automatic document feeder. The automatic document feeder includes a first paper transfer path, a second paper transfer path, a paper exit, a paper tray, and a paper inverting device. The paper inverting device includes a guiding structure, a power mechanism, and a controller. The guiding structure is disposed over the paper tray and arranged beside the paper exit, wherein the guiding structure comprises a bent part for stopping a paper. The power mechanism is connected with the guiding structure for driving rotation of the guiding structure. The controller is used for controlling a rotating direction and a rotating angle of the guiding structure. When the paper is transmitted to the paper exit along the first paper transfer path, the guiding structure is in a static status to press the paper. When the paper is transmitted to the paper exit along the second paper transfer path, the power mechanism drives rotation of the guiding structure in a first direction, so that a front end of the paper is contacted with the bent part of the guiding structure. When the paper is transmitted to the paper tray in a reverse feeding direction, the power mechanism drives rotation of the guiding structure in a second direction, so that the guiding structure is gradually distant from the paper.

In an embodiment, the power mechanism comprises a DC motor and a gear.

In an embodiment, the guiding structure further includes a post. In addition, the post is fixed on a wheel surface of the gear.

In an embodiment, the paper inverting device further includes a first sensor, wherein the first sensor is located upstream of the paper exit for detecting a position of the paper.

In an embodiment, the first sensor is an optical sensor.

In an embodiment, the paper inverting device further includes a second sensor for detecting a thickness of the paper. As the thickness of the paper is increased, the rotating angle of the guiding structure is increased.

In an embodiment, the second sensor is a torque sensor.

In an embodiment, the bent part is a curved plate.

In an embodiment, the bent part includes two flat plates. The two flat plates are connected with each other. In addition, an included angle is formed between the two flat plates.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides a paper inverting device. The paper inverting device may be applied to a single-sided automatic document feeder or a duplex automatic document feeder. Moreover, the scanning apparatus with the duplex automatic document feeder may be used to perform a single-sided scanning operation. The automatic document feeder may be installed on a copier, a printer, a scanner or any other widely-used office machine. In this embodiment, the automatic document feeder is a duplex automatic document feeder. The duplex automatic document feeder is installed on a scanning apparatus for feeding papers in order to allow the papers to be scanned. It is to be noted that the following descriptions of the duplex automatic document feeder are presented herein for purpose of illustration and description only.

Figure 1:
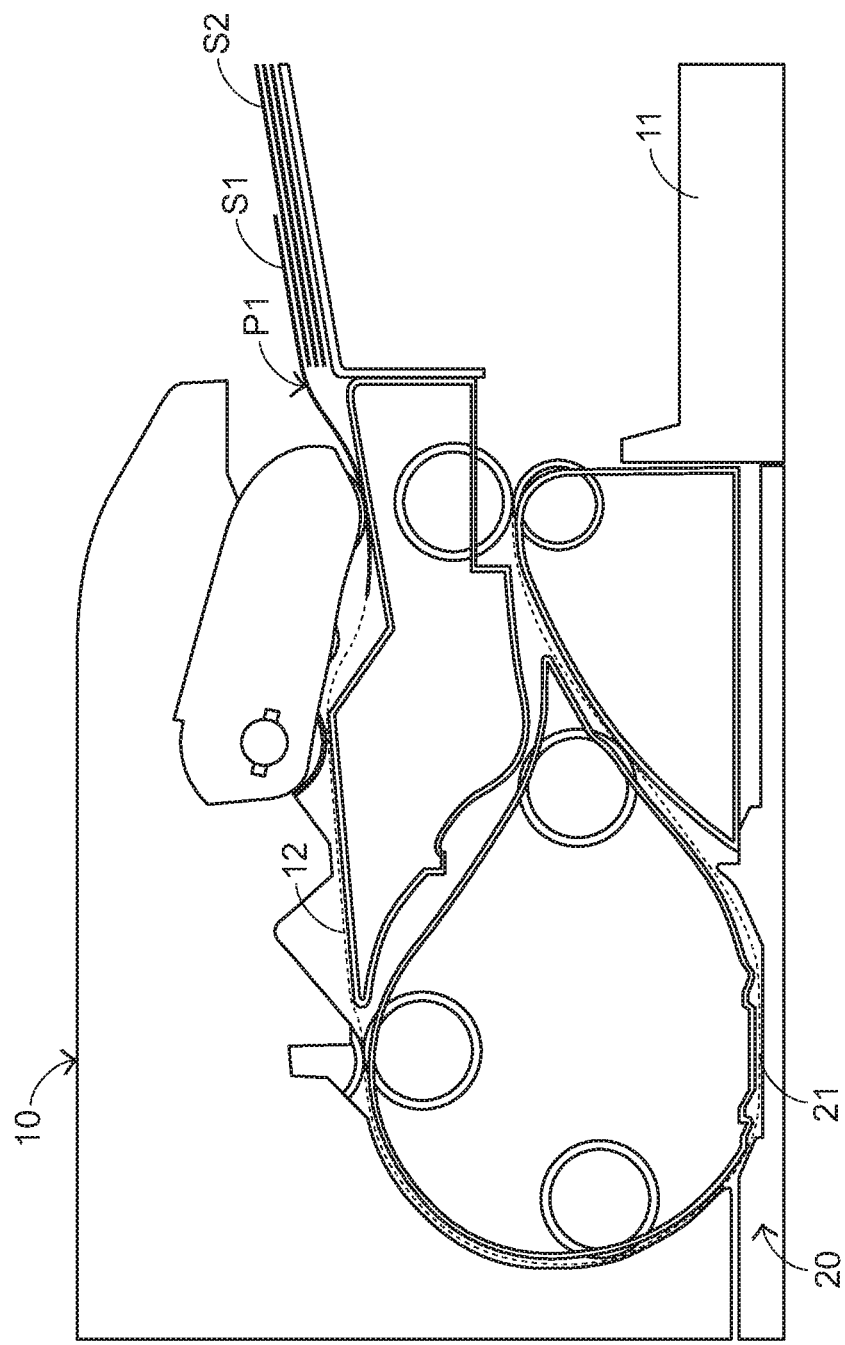
FIGS. 1~3 schematically illustrate the actions of a conventional duplex automatic document feeder.
Figure 2:
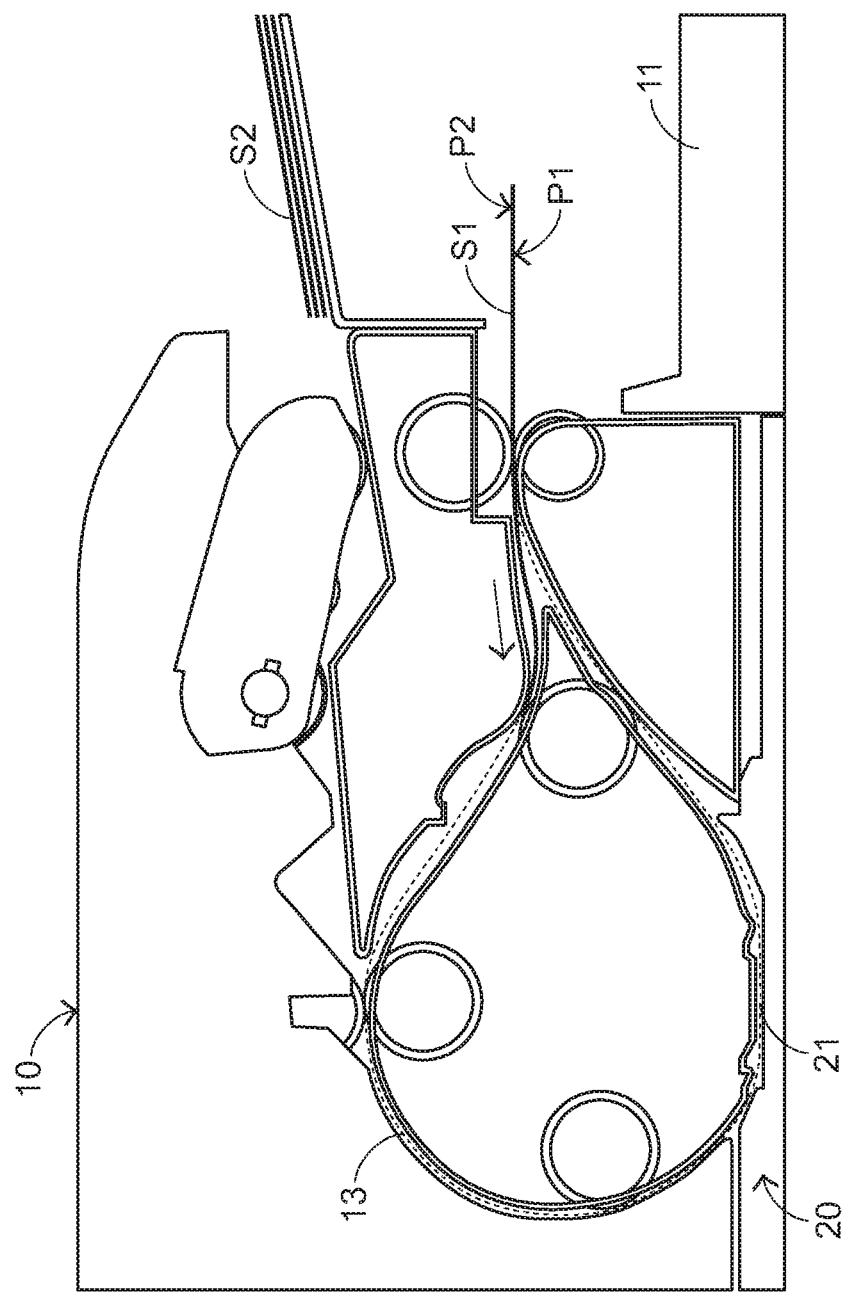
Figure 3:
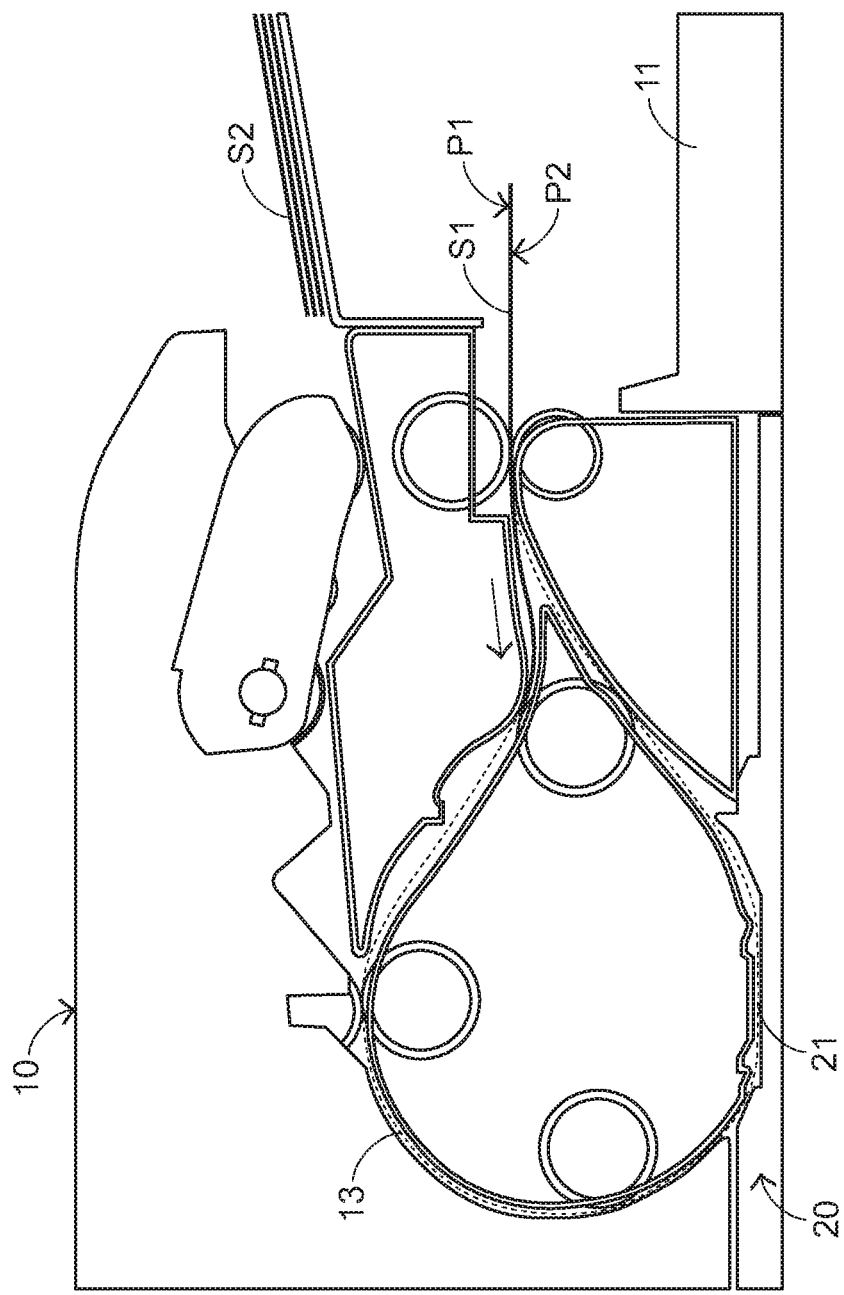
Figure 4:
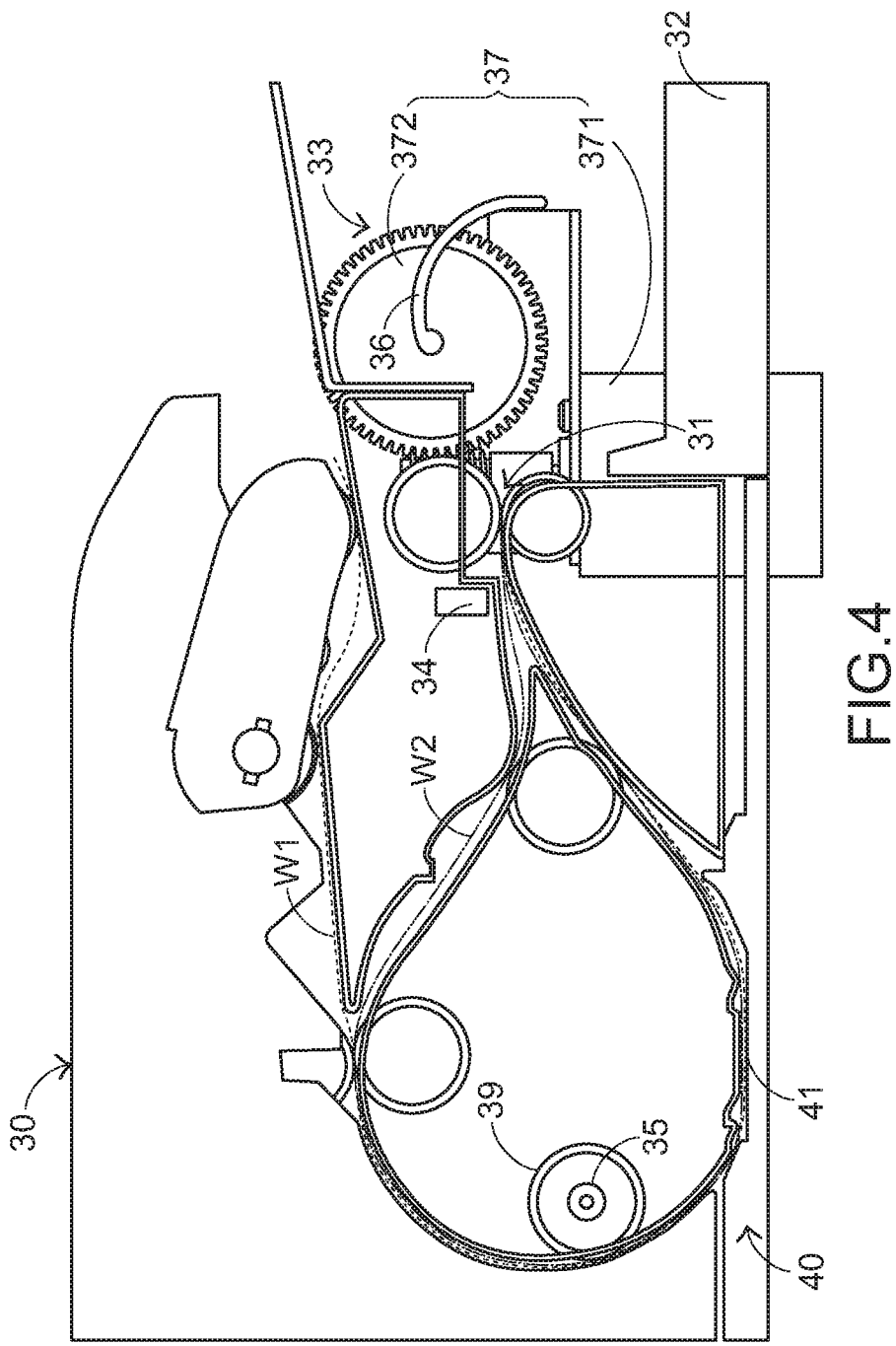
FIG. 4 schematically illustrates an automatic document feeder and a scanning apparatus according to an embodiment of the present invention.

FIG. 4 schematically illustrates an automatic document feeder and a scanning apparatus according to an embodiment of the present invention. As shown in FIG. 4, the automatic document feeder 30 is disposed over the scanning apparatus 40.

The automatic document feeder 30 comprises a paper exit 31, a paper tray 32, a paper inverting device 33, a damper wheel 39, a first paper transfer path W1, and a second paper transfer path W2. The paper inverting device 33 comprises a first sensor 34, a second sensor 35, a guiding structure 36, a power mechanism 37, and a controller 38 (see FIG. 5). The paper inverting device 33 is used for inverting the papers in order to adjust the sequence of the page numbers of the original stack of papers. The operations of the paper inverting device 33 will be illustrated in more details later.

Hereinafter, the installation positions of all components of the automatic document feeder 30 will be illustrated with reference to FIG. 4.

As shown in FIG. 4, the paper tray 32 is located downstream of the paper exit 31 for supporting the papers that are outputted from the paper exit 31. The first paper transfer path W1 and the second paper transfer path W2 are disposed within the automatic document feeder 30. The first paper transfer path W1 and the second paper transfer path W2 are served as the paths for transferring the paper that is introduced into the automatic document feeder 30. The first paper transfer path W1 and the second paper transfer path W2 have a common terminal point. In this embodiment, the paper exit 31 is the common terminal point.

For performing a single-sided scanning operation by the automatic document feeder 30, the paper is firstly transferred through the scanning window 41 of the scanning apparatus 40 along the first paper transfer path W1 and then ejected to the paper tray 32 through the paper exit 31.

For performing a duplex scanning operation by the automatic document feeder 30, the paper is firstly transferred through the scanning window 41 of the scanning apparatus 40 along the first paper transfer path W1, wherein the first side of the paper faces the scanning window 41 of the scanning apparatus 40. Then, the paper is transferred through the scanning window 41 of the scanning apparatus 40 along the second paper transfer path W2, wherein the second side of the paper faces the scanning window 41 of the scanning apparatus 40. After the paper is transferred through the first paper transfer path W1 and the second paper transfer path W2, the duplex scanning operation is completed.

For minimizing the automatic document feeder 30, the feeding mechanism of the automatic document feeder 30 is substantially identical to the feeding mechanism of the conventional automatic document feeder. As shown in FIG. 4, the first paper transfer path W1 and the second paper transfer path W2 are partially overlapped with each other in order to save the space within the automatic document feeder 30. The way of saving the space by partially overlapping the first paper transfer path W1 with the second paper transfer path W2 is presented herein for purpose of illustration and description only.

Please refer to FIG. 4 again. The first sensor 34 is located upstream of the paper exit 31. In addition, the first sensor 34 is located at the overlapped region between the first paper transfer path W1 and the second paper transfer path W2 for detecting the position of the paper.

Moreover, the second sensor 35 of the paper inverting device 33 is coaxial with the damper wheel 39 of the automatic document feeder 30. The second sensor 35 is used for detecting the torque of the damper wheel 39 in order to facilitate the controller 38 (see FIG. 5) to judge the thickness of the paper. As the thickness of the paper is increased, the torque generated by the damper wheel 39 is increased, and thus the torque value sensed by the second sensor 35 is increased.

Figure 5:
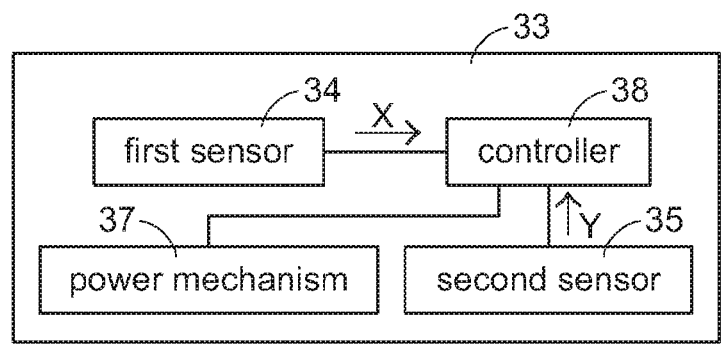
FIG. 5 is a schematic functional block diagram illustrating a paper inverting device according to an embodiment of the present invention.

FIG. 5 is a schematic functional block diagram illustrating a paper inverting device according to an embodiment of the present invention. As shown in FIG. 5, the paper inverting device 33 comprises a first sensor 34, a second sensor 35, and a power mechanism 37. The first sensor 34, the second sensor 35 and the power mechanism 37 are electrically connected with the controller 38.

In this embodiment, the first sensor 34 is an optical sensor. For example, the first sensor 34 includes but is not limited to an infrared sensor. The second sensor 35 is an ultrasonic sensor, a torque sensor or any other well-known paper thickness sensor. In this embodiment, the second sensor 35 is a torque sensor.

In this embodiment, the second sensor 35 is used for determining the rotating angle of the guiding structure 36 according to the thickness of the paper, so that the thickness of the paper is positively correlated with the rotating angle of the guiding structure 36. Alternatively, in some embodiments, the second sensor is not included in the paper inverting device. Please refer to FIGS. 4 and 5. When the paper is transferred through the first sensor 34 to trigger the first sensor 34, the first sensor 34 issues a sensing signal X to the controlling unit 38. According to the sensing signal X, the controller 38 drives the power mechanism 37 in order to determine the timing of rotating the guiding structure 36 and the rotating direction of the guiding structure 36.

Upon rotation of the damper wheel 39, the torque of the damper wheel 39 is sensed by the second sensor 35. According to the sensed torque, the second sensor 35 issues a sensing signal Y to the controlling unit 38. According to the sensing signal Y, the controlling unit 38 judges whether the thickness of the paper is smaller than or equal to a predetermined thickness value. If the judging condition is satisfied, the controller 38 drives the power mechanism 37 to rotate the guiding structure 36 by a first rotating angle. Whereas, if the judging condition is not satisfied, it means that the paper is too thick to be inverted. Under thus circumstance, the controller 38 drives the power mechanism 37 to rotate the guiding structure 36 by a second rotating angle, wherein the second rotating angle is greater than the first rotating angle.

Hereinafter, the functions of the components of the paper inverting device 33 will be illustrated in more details.

Please refer to FIG. 4. The guiding structure 36 is disposed over the paper tray 32 and arranged beside the paper exit 31 for stopping the paper. The power mechanism 37 is used for driving rotation of the guiding structure 36. In this embodiment, the power mechanism 37 comprises a DC motor 371 and a gear 372.

Figure 6:
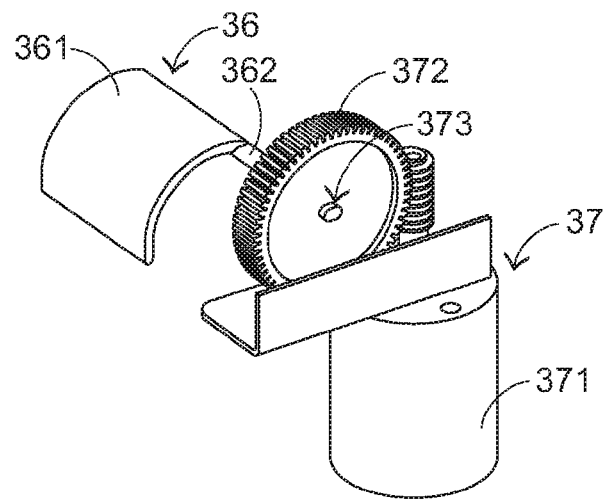
FIG. 6 is a schematic partial perspective view illustrating a paper inverting device according to an embodiment of the present invention.

FIG. 6 is a schematic partial perspective view illustrating a paper inverting device according to an embodiment of the present invention. As shown in FIG. 6, the guiding structure 36 comprises a bent part 361 and a post 362. The post 362 is located at a side of the bent part 361, and connected with the bent part 361. In this embodiment, an example of the bent part 361 includes but is not limited to a curved plate.

Please refer to FIG. 6 again. The power mechanism 37 comprises the DC motor 371 and the gear 372. The gear 372 of the power mechanism 37 comprises a pivotal hole 373. The post 362 is inserted into the pivotal hole 373 of the gear 372. Consequently, the power mechanism 37 is in power communication with the guiding structure 36. When the DC motor 371 drives rotation of the gear 372, the post 362 is synchronously rotated with the gear 372, so that the bent part 361 of the guiding structure 36 is correspondingly rotated.

Figure 7:
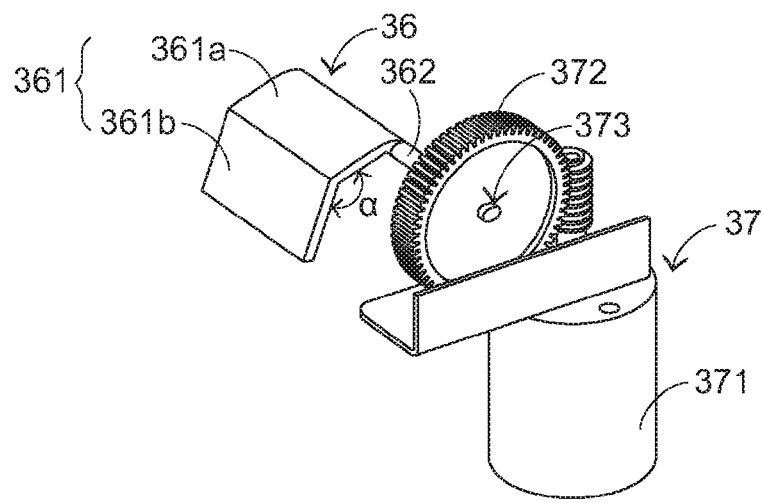
FIG. 7 is a schematic partial perspective view illustrating a paper inverting device according to another embodiment of the present invention.

Another embodiment of the paper inverting device will be illustrated with reference to FIG. 7. FIG. 7 is a schematic partial perspective view illustrating a paper inverting device according to another embodiment of the present invention. As shown in FIG. 7, the guiding structure 36 comprises a bent part 361 and a post 362. The post 362 is located at a side of the bent part 361, and connected with the bent part 361. In this embodiment, the bent part 361 comprises two flat plates 361$a$ and 361$b$. These two flat plates 361$a$ and 361$b$ are connected with each other. In addition, an included angle $\alpha$ is formed between the two flat plates 361$a$ and 361$b$. The included angle $\alpha$ is an acute angle, an obtuse angle or a right angle.

Please refer to FIG. 7 again. The power mechanism 37 comprises the DC motor 371 and the gear 372. The gear 372 of the power mechanism 37 comprises a pivotal hole 373. The post 362 is inserted into the pivotal hole 373 of the gear 372. Consequently, the power mechanism 37 is in power communication with the guiding structure 36. When the DC motor 371 drives rotation of the gear 372, the post 362 is synchronously rotated with the gear 372, so that the bent part 361 of the guiding structure 36 is correspondingly rotated.

Figure 8:
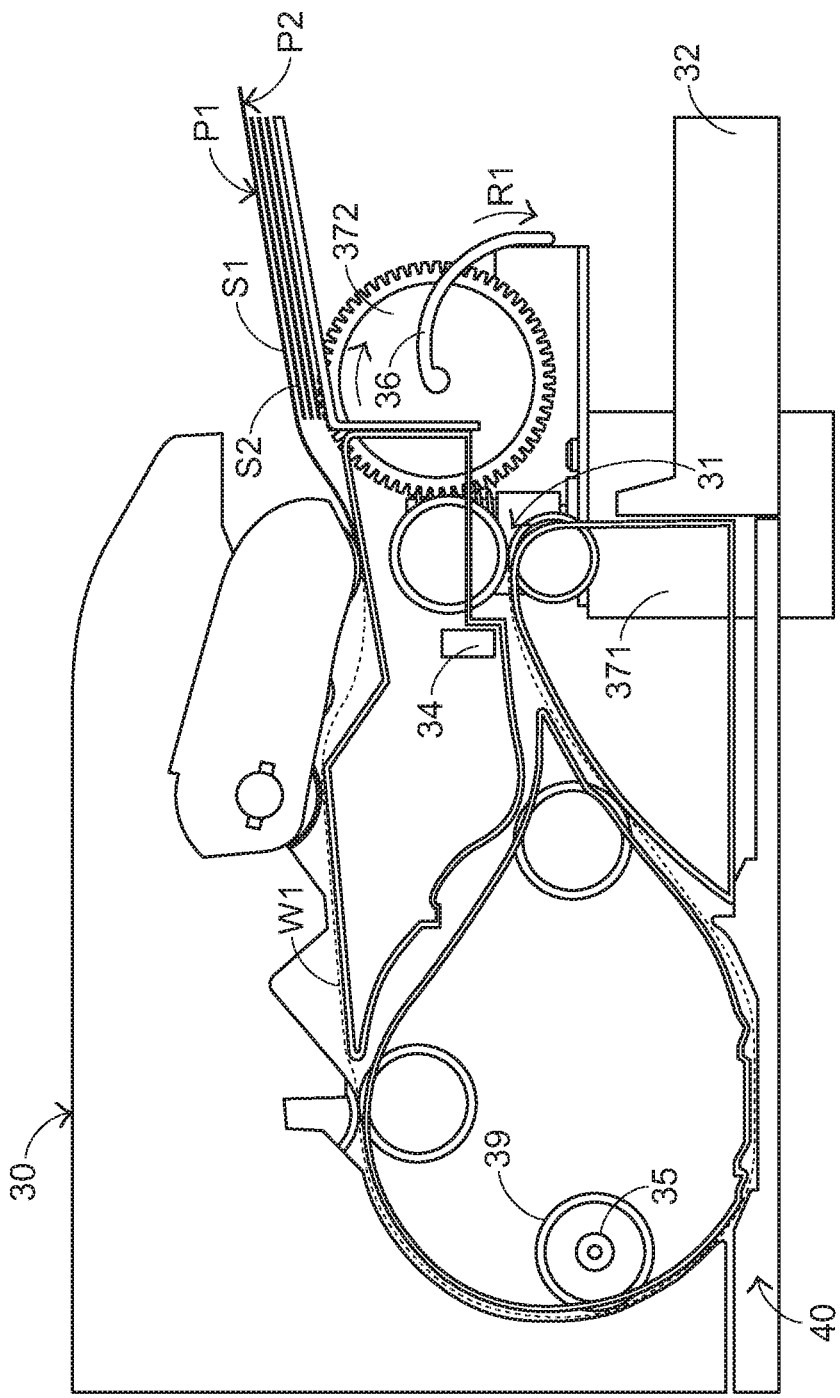
FIGS. 8~10 schematically illustrate the actions of a single-sided feeding operation performed by the automatic document feeder of the present invention.
Figure 9:
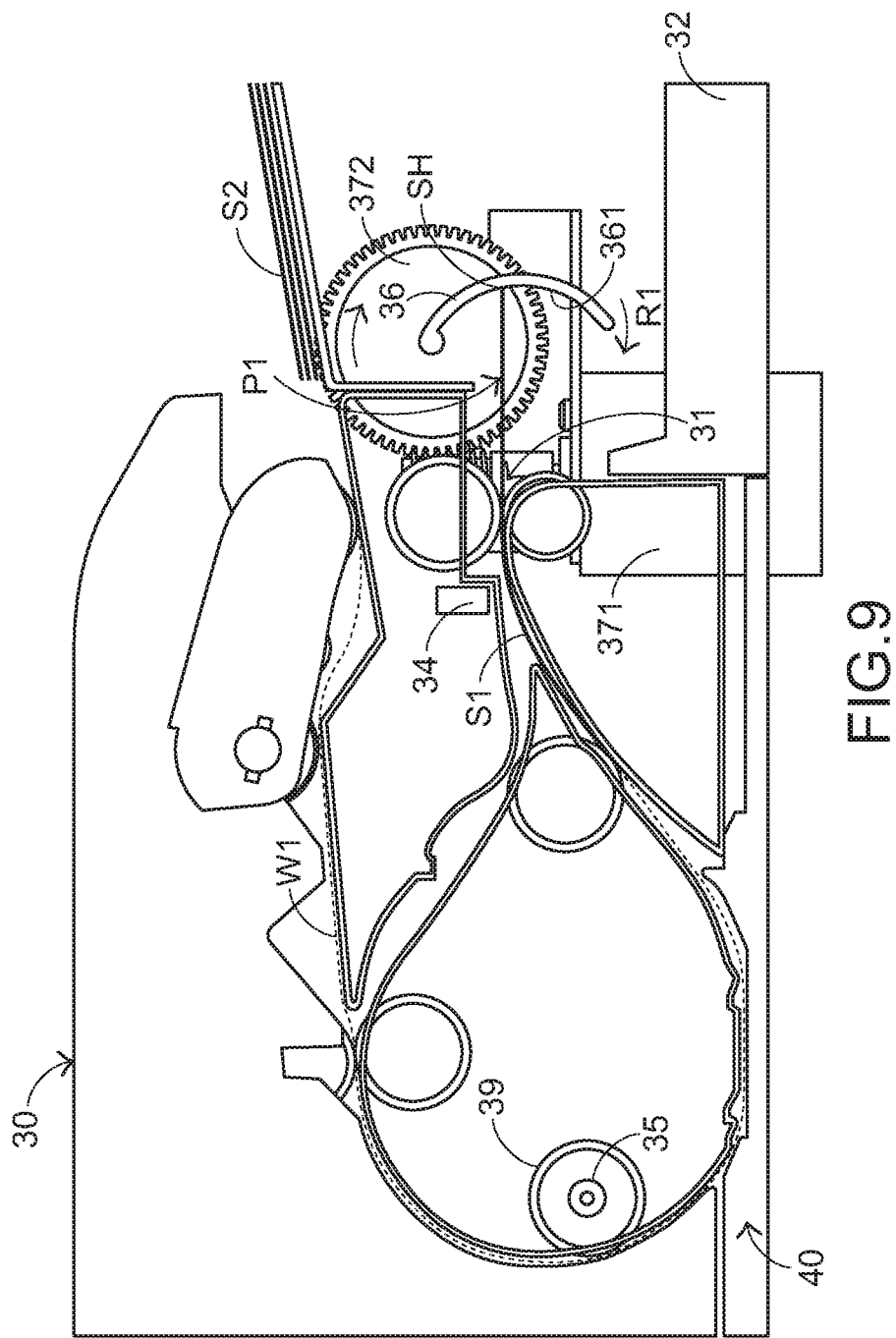
Figure 10:
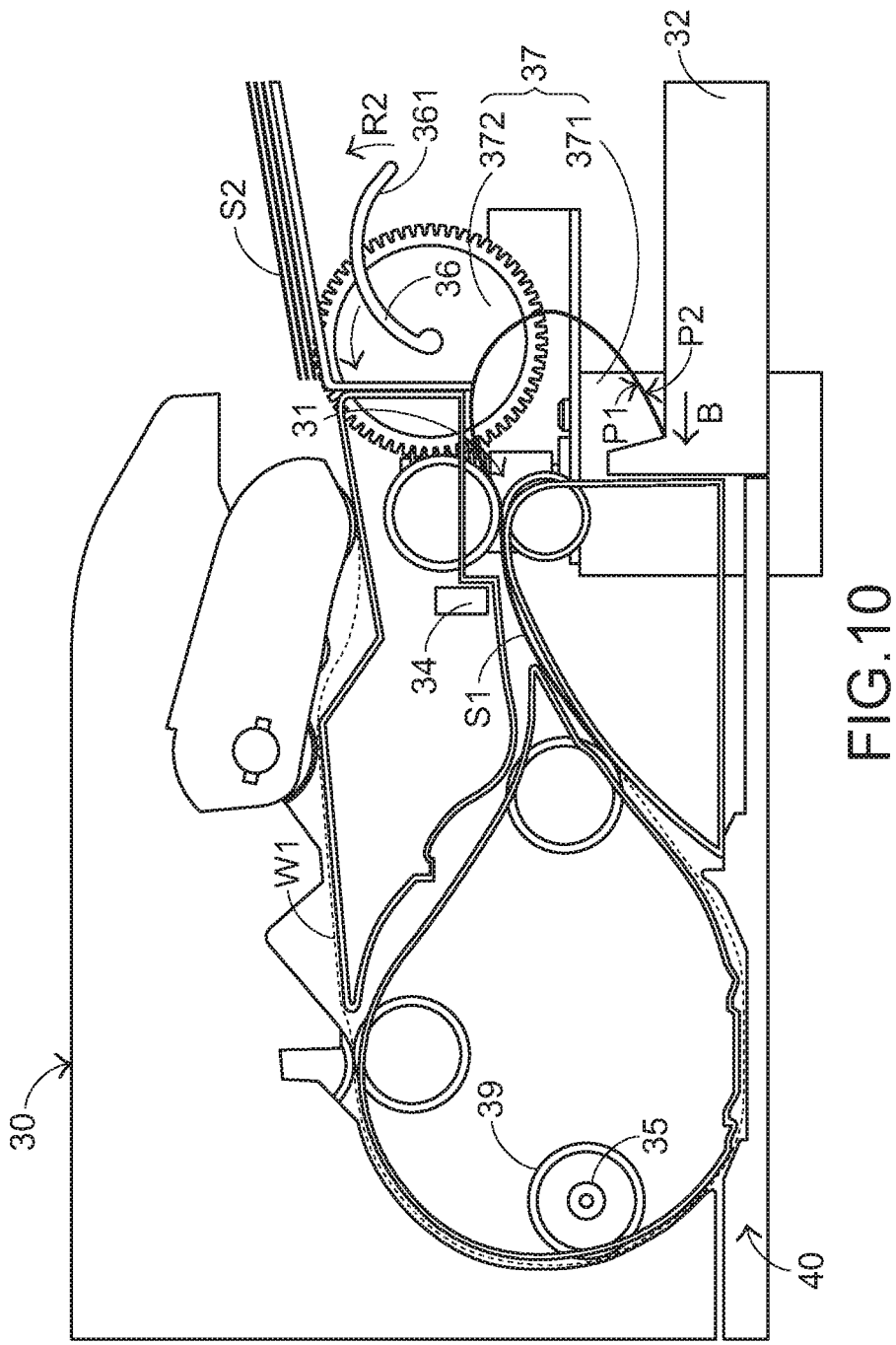

Please refer to FIGS. 8~10. FIGS. 8~10 schematically illustrate the actions of a single-sided feeding operation performed by the automatic document feeder of the present invention. As shown in FIG. 8, a first paper S1 of the original stack of papers comprises a first side P1 and a second side P2. The second side P2 of the first paper S1 faces a second paper S2.

When the first paper S1 is introduced into the first paper transfer path W1 and the first paper S1 is sensed by the first sensor 34, the controller 38 (see FIG. 5) controls the DC motor 371 to drive a rotation of the gear 372. As the gear 372 is rotated, the guiding structure 36 is correspondingly rotated in a first direction R1.

Then, as shown in FIG. 9, the first paper S1 is continuously moved forwardly and ejected from the paper exit 31. Meanwhile, a front end SH of the first paper S1 is contacted with the bent part 361 of the guiding structure 36. Since the guiding structure 36 is being rotated in the first direction R1, the first paper S1 contacted with the bent part 361 of the guiding structure 36 will be stopped by the guiding structure 36.

Please refer to FIG. 10. After the first paper S1 is stopped by the guiding structure 36, the first paper S1 is transmitted to the paper tray 32 in a reverse feeding direction B. After the first paper S1 is introduced into the paper tray 32 and contacted with the front end of the paper tray 32, the controller 38 (see FIG. 5) controls the DC motor 371 to drive a reverse rotation of the gear 372. As the gear 372 is reversely rotated, the guiding structure 36 is correspondingly rotated in a second direction R2. Under this circumstance, the bent part 361 of the guiding structure 36 is gradually distant from the first paper S1.

Meanwhile, the second side P2 of the first paper S1 faces the paper tray 32, and the first side P1 of the first paper S1 faces upwardly. After the second paper S2 is placed on the paper tray 32, the first side P1 of the first paper S1 faces the second paper S2.

From the above discussions, after the single-sided feeding operation is performed, the sequence of the page numbers of the scanned papers S1 and S2 on the paper tray 32 is different from the sequence of the page numbers of the original stack of papers. For allowing the sequence of the page numbers of the scanned papers on the paper tray 32 to be identical to the sequence of the page numbers of the original stack of papers, the paper inverting device 33 may be manually disabled. Consequently, the guiding structure 36 is in a static status.

Figure 11:
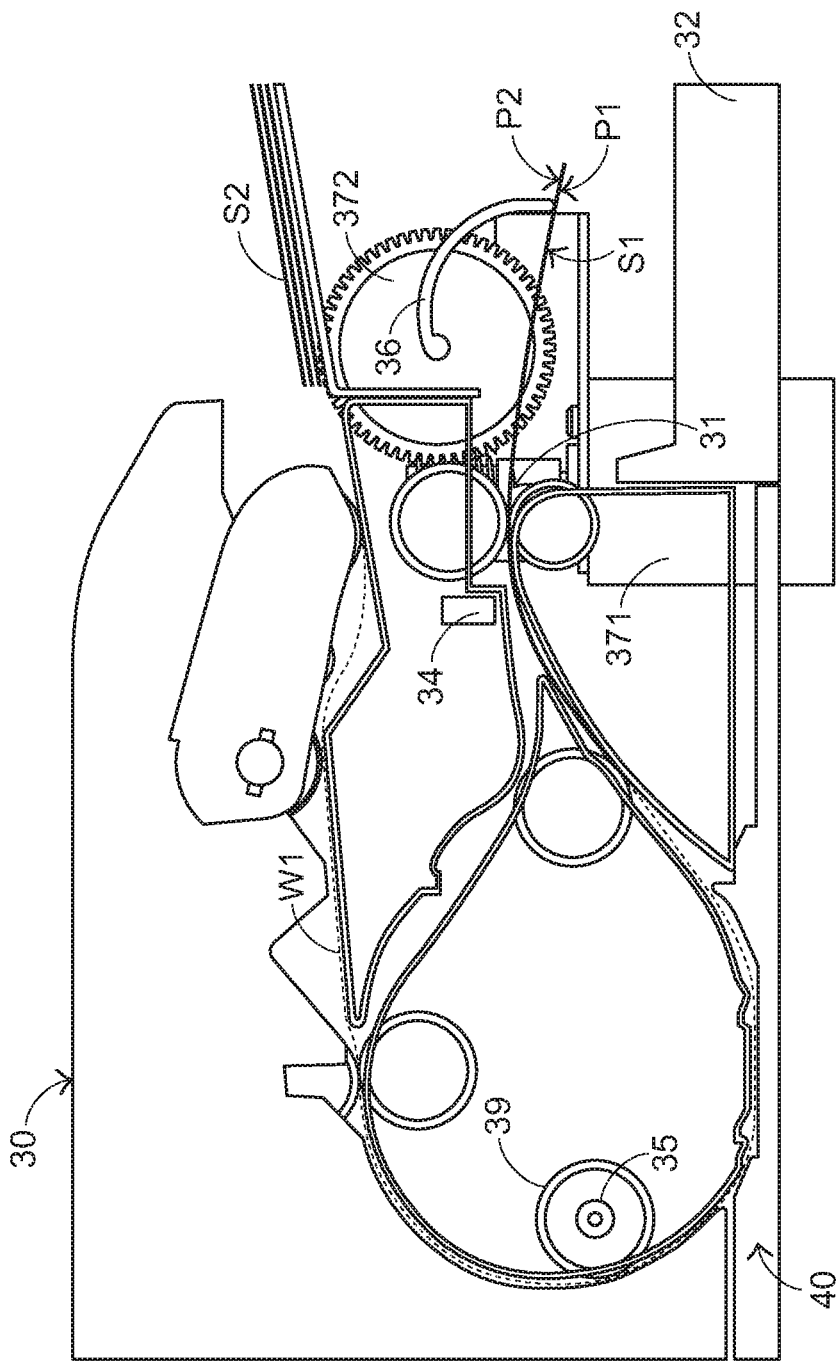
FIG. 11 schematically illustrates an action of a single-sided feeding operation performed by the automatic document feeder of the present invention, in which the guiding structure is in a static status.

FIG. 11 schematically illustrates an action of a single-sided feeding operation performed by the automatic document feeder of the present invention, in which the guiding structure is in a static status. As shown in FIG. 11, when the guiding structure 36 is in the static status, the first paper S1 is pressed by the guiding structure 36. Under this circumstance, the first side P1 of the first paper S1 faces the paper tray 32, and the second side P2 of the first paper S1 faces upwardly. After the second paper S2 is placed on the paper tray 32, the second side P2 of the first paper S1 faces the second paper S2. In other words, the sequence of the page numbers of the scanned papers on the paper tray 32 is identical to the sequence of the page numbers of the original stack of papers.

Figure 12:
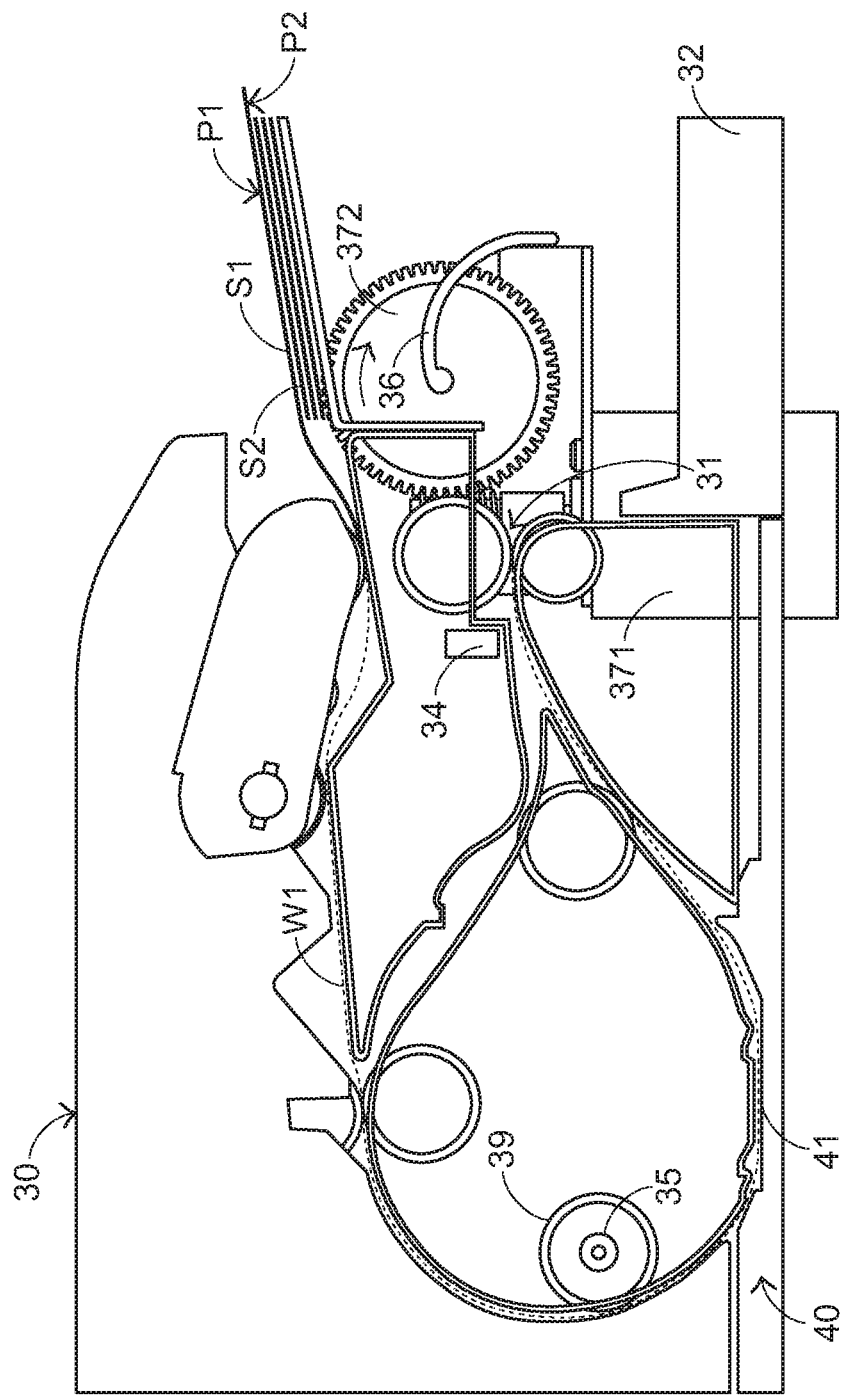
FIGS. 12~16 schematically illustrate the actions of a duplex feeding operation performed by the automatic document feeder of the present invention.

Please refer to FIGS. 12~16. FIGS. 12~16 schematically illustrate the actions of a duplex feeding operation performed by the automatic document feeder of the present invention. As shown in FIG. 12, a first paper S1 of the original stack of papers comprises a first side P1 and a second side P2. The second side P2 of the first paper S1 faces a second paper S2.

After the first paper S1 is introduced into the first paper transfer path W1, the first side P1 of the first paper S1 faces the scanning window 41 of the scanning apparatus 40. When the first paper S1 is detected by the first sensor 34, in comparison with the single-sided feeding operation, the controller 38 (see FIG. 5) does not drive the rotation of the guiding structure 36. Under this circumstance, the guiding structure 36 is in the static status.

Figure 13:
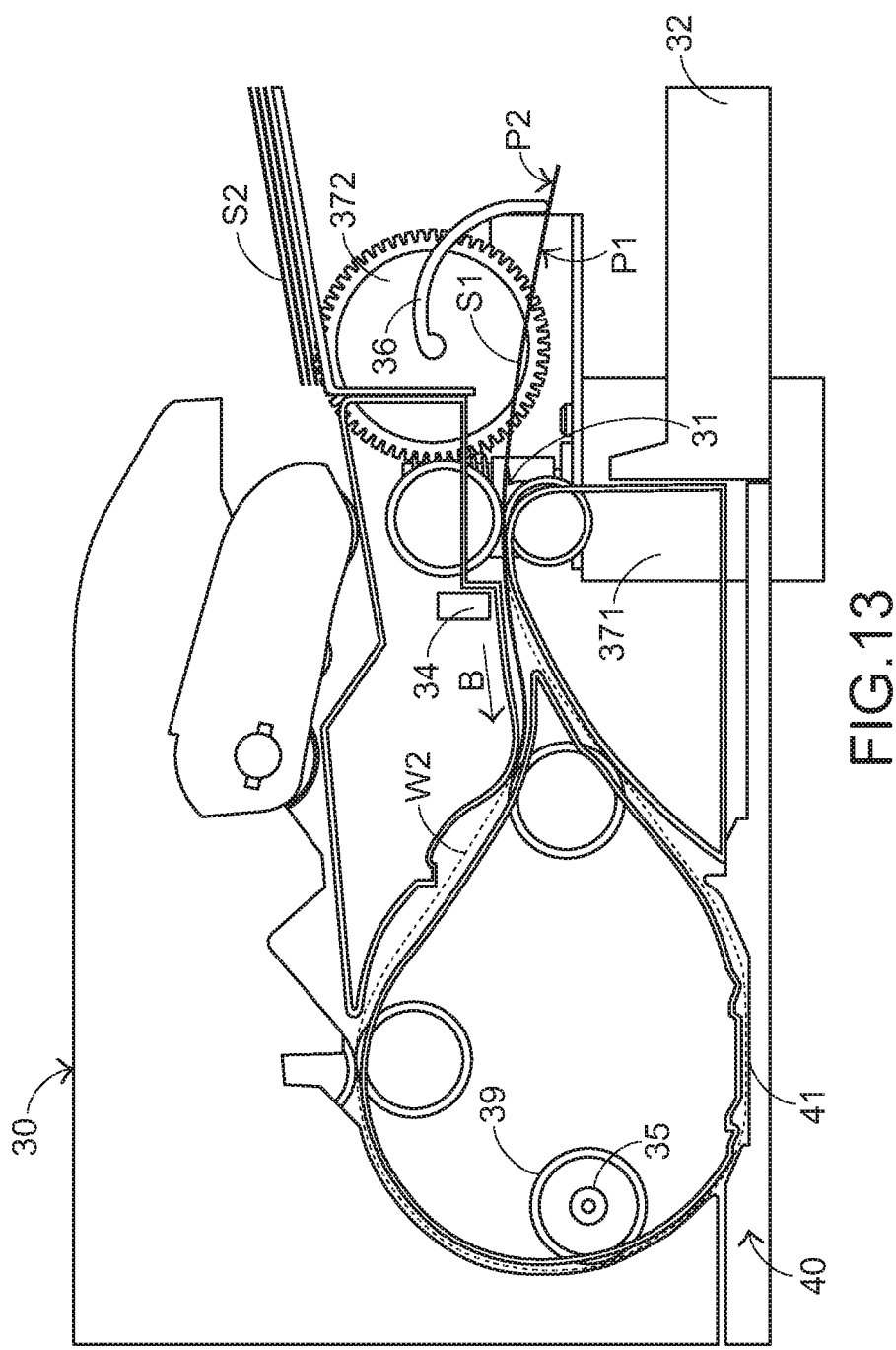

Please refer to FIG. 13. The guiding structure 36 is in the static status, so that the first paper S1 is pressed by the guiding structure 36. After the first paper S1 is ejected from the paper exit 31 and the first paper S1 is introduced into the second paper transfer path W2 in the reverse feeding direction B, the duplex feeding operation is performed. Under this circumstance, the second side P2 of the first paper S1 faces the scanning window 41 of the scanning apparatus 40.

Figure 14:
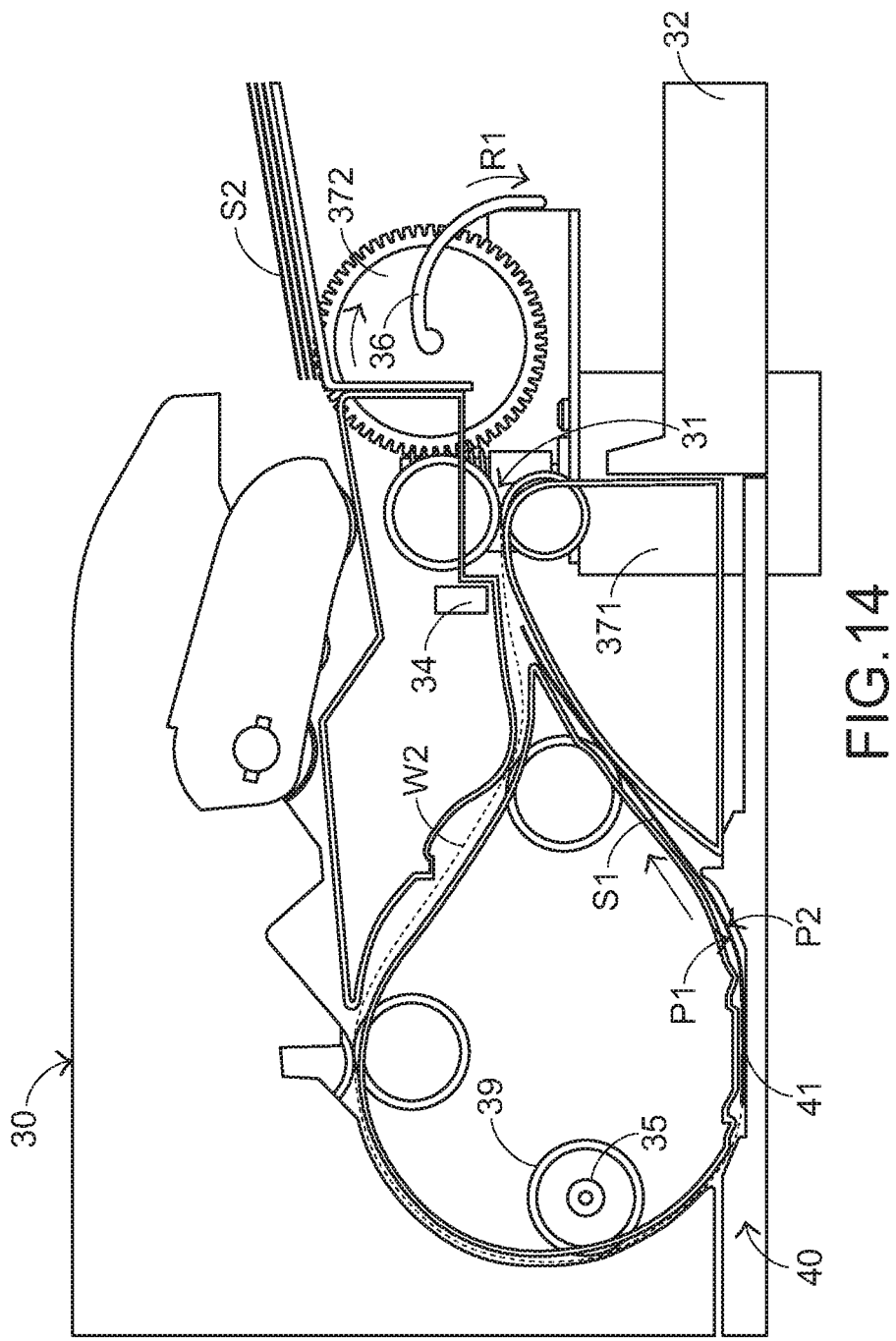

Please refer to FIG. 14. When the first paper S1 is moved to the position near the paper exit 31 again and the first paper S1 is detected by the first sensor 34, the controller 38 (see FIG. 5) controls the DC motor 371 to drive a rotation of the gear 372. As the gear 372 is rotated, the guiding structure 36 is correspondingly rotated in a first direction R1.

Figure 15:
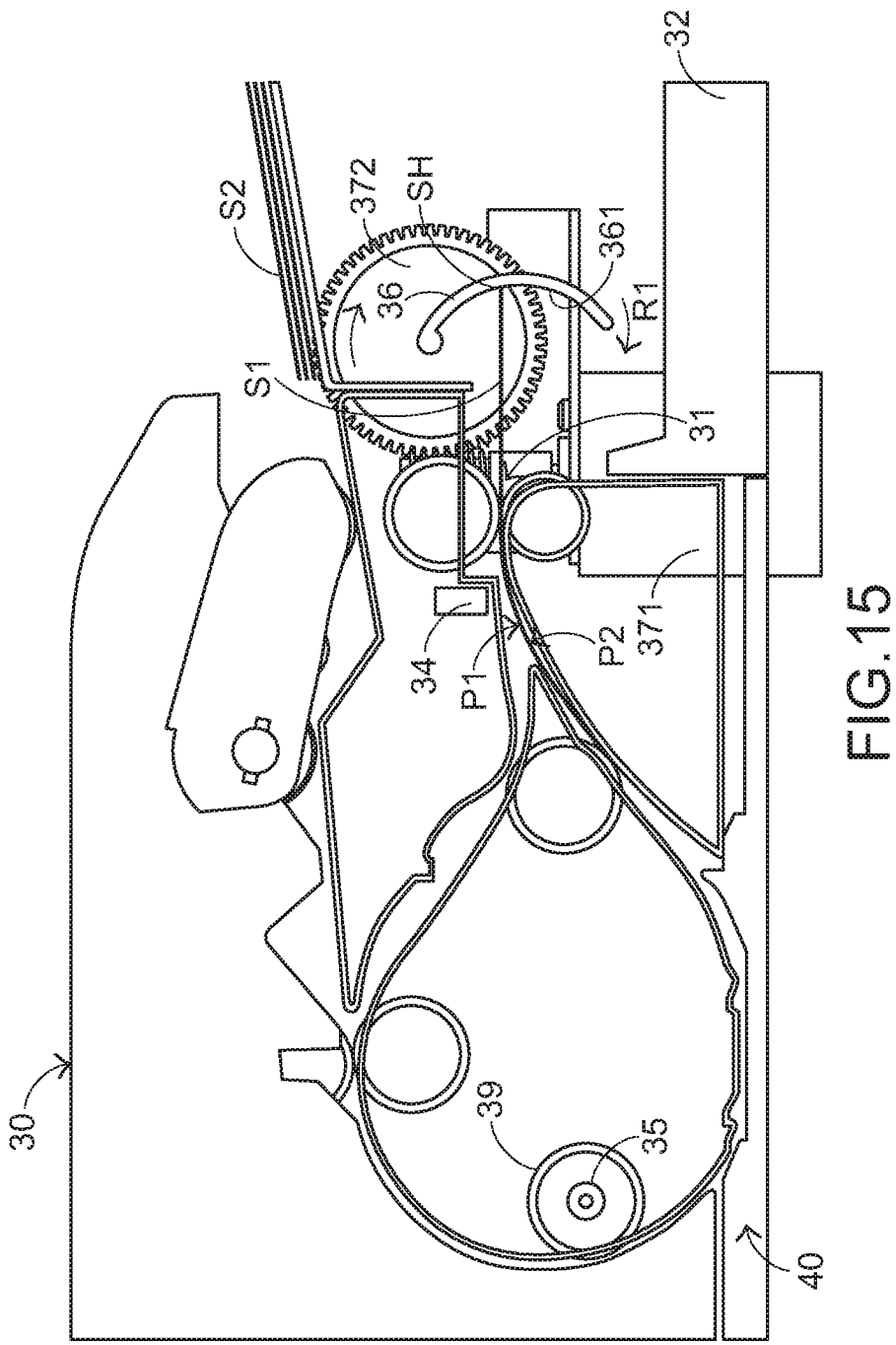

Then, as shown in FIG. 15, the first paper S1 is continuously moved forwardly and ejected from the paper exit 31. Meanwhile, a front end SH of the first paper S1 is contacted with the bent part 361 of the guiding structure 36. Since the guiding structure 36 is being rotated in the first direction R1, the first paper S1 contacted with the bent part 361 of the guiding structure 36 will be stopped by the guiding structure 36.

Figure 16:
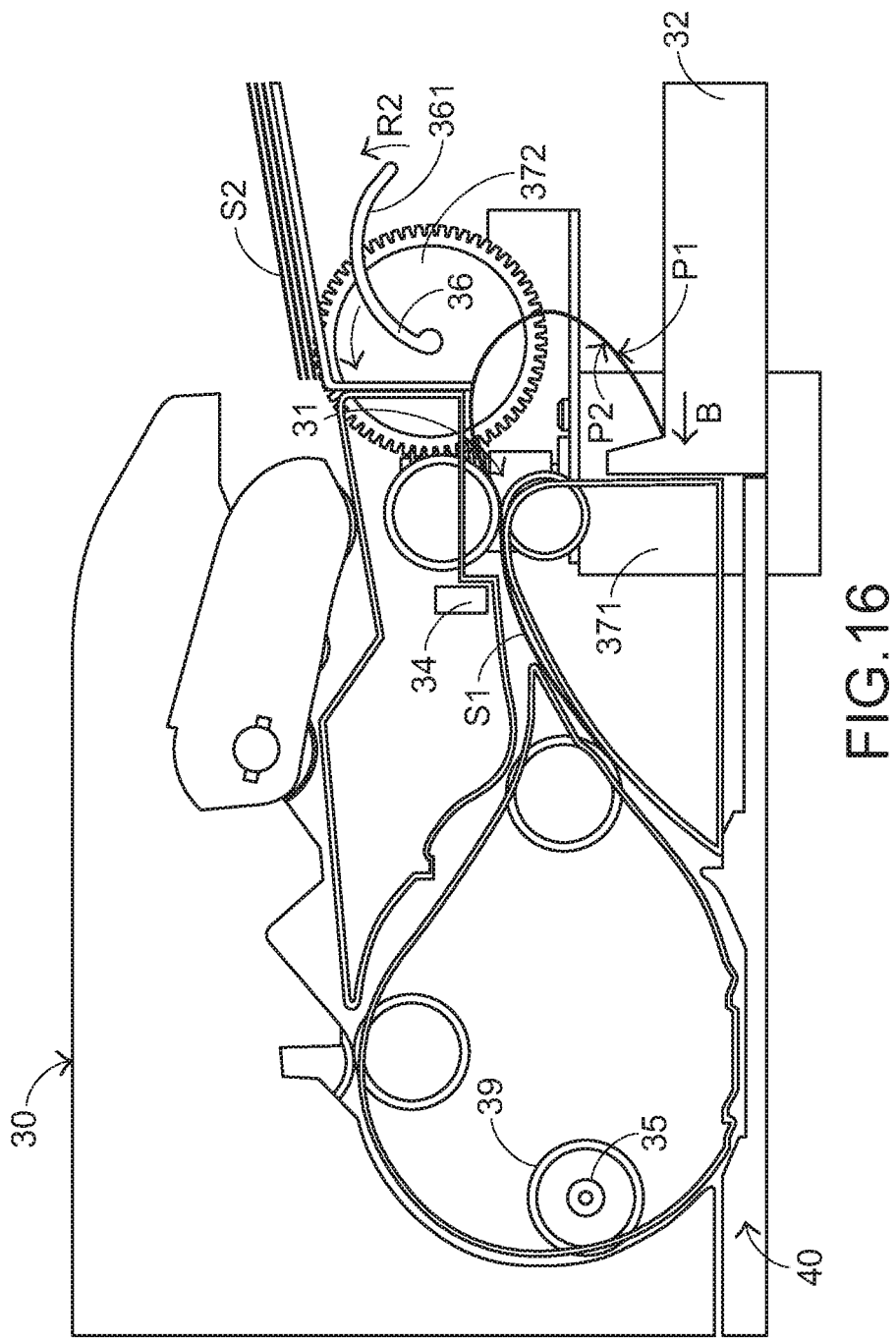

Please refer to FIG. 16. After the first paper S1 is stopped by the guiding structure 36, the first paper S1 is transmitted to the paper tray 32 in the reverse feeding direction B. After the first paper S1 is introduced into the paper tray 32 and contacted with the front end of the paper tray 32, the controller 38 (see FIG. 5) controls the DC motor 371 to drive a reverse rotation of the gear 372. As the gear 372 is reversely rotated, the guiding structure 36 is correspondingly rotated in a second direction R2. Under this circumstance, the bent part 361 of the guiding structure 36 is gradually distant from the first paper S1.

Meanwhile, the first side P1 of the first paper S1 faces the paper tray 32, and the second side P2 of the first paper S1 faces upwardly. After the second paper S2 is placed on the paper tray 32, the second side P2 of the first paper S1 faces the second paper S2. From the above discussions, after the duplex feeding operation is performed, the sequence of the page numbers of the scanned papers S1 and S2 on the paper tray 32 is identical to the sequence of the page numbers of the original stack of papers.

Moreover, the first direction R1 and the second direction R2 are opposed to each other. In this embodiment, the first direction R1 is a clockwise direction, and the second direction R2 is an anti-clockwise direction.

From the above descriptions, the present invention provides a paper inverting device. The paper inverting device comprises a first sensor, a second sensor, a guiding structure, a power mechanism, and a controller. The power mechanism is used for driving rotation of the guiding structure. The first sensor is used for detecting the position of the paper. The second sensor is used for detecting the thickness of the paper. According to the sensing signals from the first sensor and the second sensor, the controller may determine the timing of rotating the guiding structure and the rotating direction and the rotating angle of the guiding structure. Consequently, the guiding structure may be controlled to stop the paper and further invert the paper. Correspondingly, the sequence of the page numbers of the scanned papers is changed. As previously described, during the duplex feeding operation is performed by the conventional duplex automatic document feeder, the paper should be transferred for three times. However, when the duplex feeding operation is performed by the automatic document feeder, the third time of transferring the paper is omitted. Consequently, the cost associated to the processing time is reduced and the feeding efficiency of the automatic document feeder is largely enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A paper inverting device for an automatic document feeder, said automatic document feeder comprising a paper exit and a paper tray, said paper inverting device comprising:
   a first sensor located upstream of said paper exit for detecting a position of a paper;
   a guiding structure disposed over said paper tray and arranged beside said paper exit, wherein said guiding structure comprises a bent part for stopping said paper;
   a power mechanism connected with said guiding structure for driving rotation of said guiding structure, wherein said power mechanism comprises a DC motor and a gear, wherein said guiding structure further comprises a post, and said post is fixed on a wheel surface of said gear; and a controller for controlling a rotating direction and a rotating angle of said guiding structure, wherein when said paper is detected by said first sensor, said power mechanism drives rotation of said guiding structure in a first direction, so that a front end of said paper is contacted with said bent part of said guiding structure, wherein when said paper is transmitted to said paper tray in a reverse feeding direction, said power mechanism drives rotation of said guiding structure in a second direction, so that said guiding structure is gradually distant from said paper.

2. The paper inverting device according to claim 1, wherein said first sensor is an optical sensor.

3. A paper inverting device for an automatic document feeder, said automatic document feeder comprising a paper exit and a paper tray, said paper inverting device comprising:
- a first sensor located upstream of said paper exit for detecting a position of a paper;
- a guiding structure disposed over said paper tray and arranged beside said paper exit, wherein said guiding structure comprises a bent part for stopping said paper;
- a power mechanism connected with said guiding structure for driving rotation of said guiding structure;
- a controller for controlling a rotating direction and a rotating angle of said guiding structure, wherein when said paper is detected by said first sensor, said power mechanism drives rotation of said guiding structure in a first direction, so that a front end of said paper is contacted with said bent part of said guiding structure, wherein when said paper is transmitted to said paper tray in a reverse feeding direction, said power mechanism drives rotation of said guiding structure in a second direction, so that said guiding structure is gradually distant from said paper; and
- a second sensor for detecting a thickness of said paper, wherein as said thickness of said paper is increased, said rotating angle of said guiding structure is increased.

4. The paper inverting device according to claim 3, wherein said second sensor is a torque sensor.

5. The paper inverting device according to claim 1, wherein said bent part is a curved plate.

6. The paper inverting device according to claim 1, wherein said bent part comprises two flat plates, wherein said two flat plates are connected with each other, and an included angle is formed between said two flat plates.

7. The paper inverting device according to claim 1, wherein when said front end of said paper is contacted with said guiding structure and said guiding structure is in a static status, said paper is pressed by said guiding structure.

8. An automatic document feeder comprising a first paper transfer path, a second paper transfer path, a paper exit, a paper tray, and a paper inverting device, wherein said paper inverting device comprises:
- a guiding structure disposed over said paper tray and arranged beside said paper exit, wherein said guiding structure comprises a bent part for stopping a paper;
- a power mechanism connected with said guiding structure for driving rotation of said guiding structure, wherein said power mechanism comprises a DC motor and a gear, wherein said guiding structure further comprises a post, and said post is fixed on a wheel surface of said gear; and
- a controller for controlling a rotating direction and a rotating angle of said guiding structure, wherein when said paper is transmitted to said paper exit along said first paper transfer path, said guiding structure is in a static status to press said paper, wherein when said paper is transmitted to said paper exit along said second paper transfer path, said power mechanism drives rotation of said guiding structure in a first direction, so that a front end of said paper is contacted with said bent part of said guiding structure, wherein when said paper is transmitted to said paper tray in a reverse feeding direction, said power mechanism drives rotation of said guiding structure in a second direction, so that said guiding structure is gradually distant from said paper.

9. The automatic document feeder according to claim 8, said paper inverting device further comprises a first sensor, wherein said first sensor is located upstream of said paper exit for detecting a position of said paper.

10. The automatic document feeder according to claim 9, wherein said first sensor is an optical sensor.

11. The automatic document feeder according to claim 8, wherein said paper inverting device further comprises a second sensor for detecting a thickness of said paper, wherein as said thickness of said paper is increased, said rotating angle of said guiding structure is increased.

12. The automatic document feeder according to claim 11, wherein said second sensor is a torque sensor.

13. The automatic document feeder according to claim 8, wherein said bent part is a curved plate.

14. The automatic document feeder according to claim 8, wherein said bent part comprises two flat plates, wherein said two flat plates are connected with each other, and an included angle is formed between said two flat plates.

* * * * *